(12) United States Patent
Matsumura (10) Patent No.: US 9,817,106 B2
(45) Date of Patent: Nov. 14, 2017

(54) PHASED-ARRAY TRANSMITTER, TRANSCEIVER, AND RADAR APPARATUS

(71) Applicant: FUJITSU LIMITED, Kawasaki-shi, Kanagawa (JP)

(72) Inventor: Hiroshi Matsumura, Isehara (JP)

(73) Assignee: FUJITSU LIMITED, Kawasaki (JP)

( * ) Notice: Subject to any disclaimer, the term of this patent is extended or adjusted under 35 U.S.C. 154(b) by 336 days.

(21) Appl. No.: 14/631,026

(22) Filed: Feb. 25, 2015

(65) Prior Publication Data

US 2015/0276919 A1    Oct. 1, 2015

(30) Foreign Application Priority Data

Mar. 31, 2014 (JP) ................................. 2014-073328

(51) Int. Cl.
| | |
|---|---|
| *G01S 7/35* | (2006.01) |
| *H01Q 3/26* | (2006.01) |
| *H01Q 1/32* | (2006.01) |

(52) U.S. Cl.
CPC ............. *G01S 7/35* (2013.01); *H01Q 1/3233* (2013.01); *H01Q 3/267* (2013.01)

(58) Field of Classification Search
CPC ......... G01S 7/35; H01Q 1/3233; H01Q 3/267
USPC .................................................... 342/175, 368
See application file for complete search history.

(56) References Cited

U.S. PATENT DOCUMENTS

2014/0225635 A1*   8/2014 Dasnurkar ....... G01R 31/31726
                                                          324/750.3

FOREIGN PATENT DOCUMENTS

| JP | H01-227977 | 9/1989 |
|---|---|---|
| JP | H05-264728 | 10/1993 |
| JP | H10-186025 | 7/1998 |

\* cited by examiner

*Primary Examiner* — Timothy A Brainard
(74) *Attorney, Agent, or Firm* — Kratz, Quintos & Hanson, LLP (57) ABSTRACT

A phased-array transmitter includes a first PLL for transmission, a control circuit, a plurality of transmission units, a delay circuit, and a second PLL for self-test. The first PLL is configured to generate a reference transmission signal, and the control circuit is configured to control the first PLL. The transmission units are configured to receive the reference transmission signal, and perform amplification and phase control to output unit transmission waves, respectively. The delay circuit is configured to delay a signal based on the reference transmission signal, and the second PLL is configured to receive an output signal of the delay circuit, and generate a self-test signal for performing self-test.

10 Claims, 10 Drawing Sheets

PHASED-ARRAY TRANSMITTER, TRANSCEIVER, AND RADAR APPARATUS

CROSS-REFERENCE TO RELATED APPLICATION

This application is based upon and claims the benefit of priority of the prior Japanese Patent Application No. 2014-073328, filed on Mar. 31, 2014, the entire contents of which are incorporated herein by reference.

FIELD

The embodiments discussed herein are related to a phased-array transmitter, a transceiver, and a radar apparatus.

BACKGROUND

Conventionally, there has been known a phased-array transmitter that inputs phase-controlled transmission signals to a plurality of arranged antennas (phased-array antennas), controls directionality thereof, and outputs a transmission wave (a radiated radio wave). The phased-array transmitter, for example, is used as a transmitter of a phased-array radar or a radio communication system that performs large data transmission.

In recent years, for example, application of a phased-array radar as a FM-CW (Frequency Modulated Continuous Wave) radar has received attention. Since the FM-CW radar can accurately measure a distance to an object and a relative speed through a relatively simple configuration, the FM-CW radar has been proposed to be mounted in a vehicle to avoid a collision in advance or to perform automatic traveling in which a distance to a front vehicle is constantly maintained, for example.

For example, a phased-array transmitter (a transceiver) used in the FM-CW radar is provided with a BIST (Built-In Self Test) circuit that performs self-test (self-diagnosis) that a transmission signal is normal.

The BIST circuit, for example, is used in order to perform the reduction of a test process at the time of manufacturing of a semiconductor chip in which the phased-array transmitter has been formed or at the time of assembling of a FM-CW radar apparatus, or to perform abnormality detection and operation compensation (amplitude/phase control) at the time of a product operation.

At the time of the product operation, for example, at the time of power-up of the FM-CW radar apparatus provided with the phased-array transmitter or at the time of a rapid change and the like in environmental temperature in which the FM-CW radar apparatus is used, a self-test is performed to control the directional characteristics of a radiated radio wave.

As described above, for example, the FM-CW radar apparatus provided with the BIST circuit has been proposed; however, for example, a PLL (Phase locked Loop) for transmission and a PLL for BIST are configured to be controlled by dedicated digital circuits, respectively.

When the respective digital circuits are provided to the PLL (PLL-TX) for transmission and a PLL (PLL for BIST: PLL-BIST) for self-test, it causes an increase in power consumption and an occupation area. Moreover, since it takes a time to set the PLL-TX and the PLL-BIST, it takes a long time to perform processes using the BIST circuit.

Incidentally, in the past, various phased-array transmitters, transceivers, or radar apparatuses have been proposed.

Patent Document 1: Japanese Laid-open Patent Publication No. H01-227977
Patent Document 2: Japanese Laid-open Utility Model Publication No. H10-186025
Patent Document 3: Japanese Laid-open Patent Publication No. H05-264728

SUMMARY

According to an aspect of the embodiments, there is provided a phased-array transmitter including a first PLL for transmission, a control circuit, a plurality of transmission units, a delay circuit, and a second PLL for self-test. The first PLL is configured to generate a reference transmission signal, and the control circuit is configured to control the first PLL.

The transmission units are configured to receive the reference transmission signal, and perform amplification and phase control to output unit transmission waves, respectively. The delay circuit is configured to delay a signal based on the reference transmission signal, and the second PLL is configured to receive an output signal of the delay circuit, and generate a self-test signal for performing self-test.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

First, before describing embodiments of a phased-array transmitter, a transceiver, and a radar apparatus will be described in detail, an example of the phased-array transmitter and problems thereof will be described with reference to FIG. 1 to FIG. 4.

Figure 1:
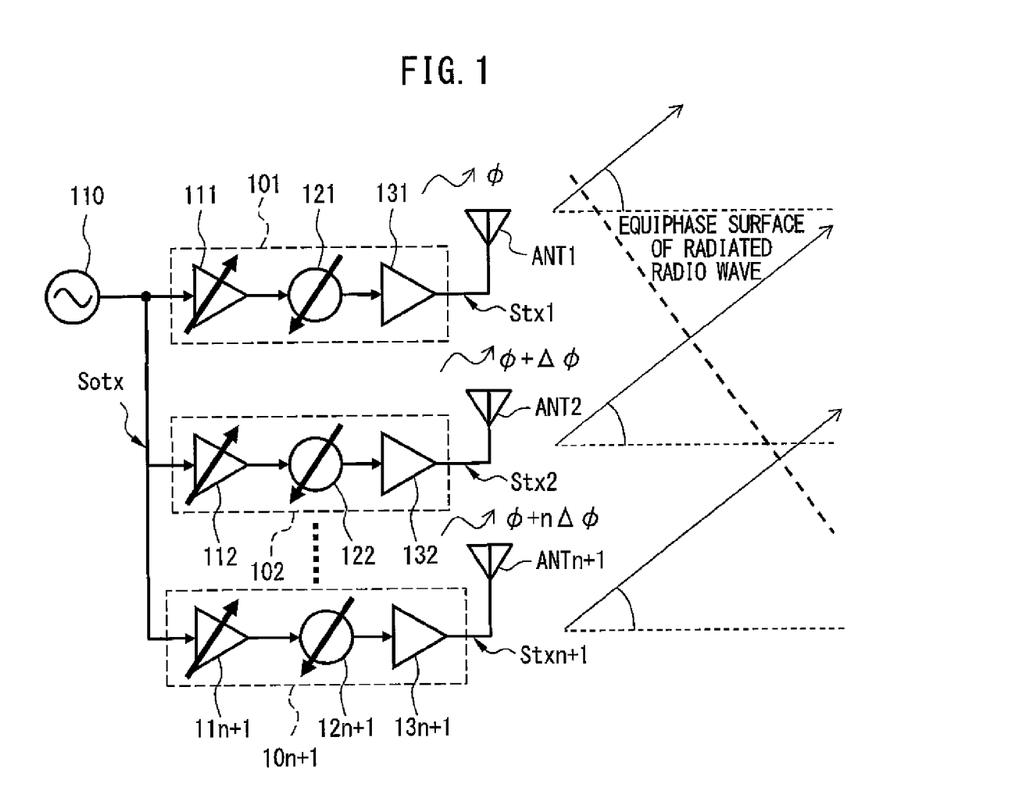
FIG. 1 is a diagram for explaining an operation of a phased-array transmitter.

FIG. 1 is a diagram for explaining an operation of a phased-array transmitter. In FIG. 1, a reference numeral 110 denotes a reference transmission signal generator, reference numerals 101, 102, . . . , 10n+1 denote transmission units, and reference numerals ANT1, ANT2, . . . , ANTn+1 denote transmission antennas.

As illustrated in FIG. 1, the phased-array transmitter, for example, includes the reference transmission signal generator 110, the transmission units 101, 102, ..., 10n+1 of n+1 channels, and the transmission antennas ANT1, ANT2, ..., ANTn+1 of n+1 channels.

The transmission units 101, 102, ..., 10n+1 include variable gain amplifiers 111, 112, ..., 11n+1, phase shifters 121, 122, ..., 12n+1, and power amplifiers 131, 132, ..., 13n+1, respectively. The variable gain amplifiers 111, 112, ..., 11n+1 receive a reference transmission signal Sotx generated by the reference transmission signal generator 110, variably amplify the amplitude of the reference transmission signal Sotx, and output the amplified reference transmission signal Sotx to the phase shifters 121, 122, ..., 12n+1, respectively.

The phase shifters 121, 122, ..., 12n+1 shift the output signals from the variable gain amplifiers 111, 112, ..., 11n+1 by a predetermined phase, and output the phase-shifted signals to the power amplifiers 131, 132, ..., 13n+1, respectively. The power amplifiers 131, 132, ..., 13n+1 power-amplify the output signals from the phase shifters 121, 122, ..., 12n+1, and radiate the power-amplified output signals (radio waves) Stx1, Stx2, ..., Stxn+1 via the transmission antennas ANT1, ANT2, ..., ANTn+1, respectively.

For example, the phased-array transmitter electrically controls the phases of the radio waves radiated from the transmission antennas ANT1, ANT2, ..., ANTn+1, shifts the phases by an optical path difference, and aligns the phases on a plane perpendicular the radiation direction of the radio waves.

The transmission unit 101 of a first channel radiates the radio wave Stx1 with a phase $\phi$ via the transmission antenna ANT1, and the transmission unit 102 of a second channel radiates the radio wave Stx2 with a phase $\phi+\Delta\phi$ via the transmission antenna ANT2.

The transmission unit 103 (not illustrated) of a third channel radiates the radio wave Stx3 with a phase $\phi+2\Delta\phi$ via the transmission antenna ANTS, and the transmission unit 10n+1 of a n+1$^{th}$ channel radiates the radio wave Stxn+1 with a phase $\phi+n\Delta\phi$ via the transmission antenna ANTn+1.

From the above, the radio waves Stx1, Stx2, ..., Stxn+1 with predetermined phase differences $\phi$, $\phi+\Delta\phi$, ..., $\phi+n\Delta\phi$ are radiated from the respective transmission antennas ANT1, ANT2, ..., ANTn+1, and equiphase surfaces of the radiated radio waves can be controlled. The transmission units 101, 102, ..., 10n+1 perform the amplitude adjustment as well as the phase adjustment.

Such a phased-array transmitter, for example, is applied to a phased-array radar mounted in a vehicle, a radio communication system that performs large capacity of data communication, and the like. Moreover, for the phased-array transmitter, for example, a frequency (30 GHz to 300 GHz) of a millimeter wave band is available; however, the present embodiment is not limited thereto, and a terahertz frequency with a shorter wavelength may also be used.

Figure 2:
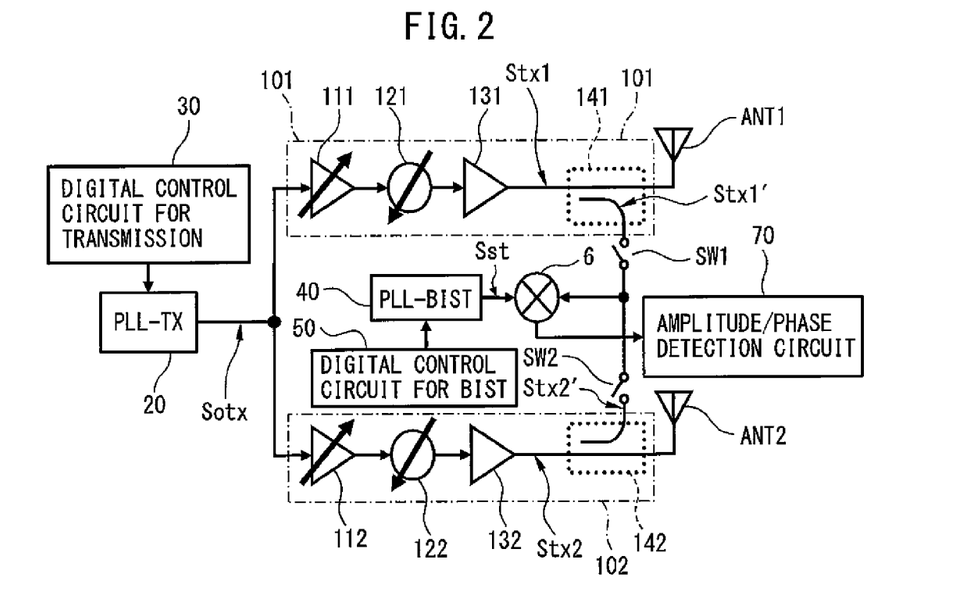
FIG. 2 is a block diagram illustrating an example of a phased-array transmitter.

FIG. 2 is a block diagram illustrating an example of the phased-array transmitter, and illustrates an example of a phased-array transmitter provided with a BIST circuit, for example, a phased-array transmitter (a transceiver) in a FM-CW radar apparatus.

FIG. 2 illustrates two transmission units 101 and 102, transmission antennas ANT1 and ANT2, and switches SW1 and SW2 for the simplification of a description; however, actually, n+1 transmission units 101, 102, ..., 10n+1 and the like are provided similarly to FIG. 1.

As illustrated in FIG. 2, the phased-array transmitter includes two (a plurality of) transmission units 101 and 102, two transmission antennas ANT1 and ANT2, two switches SW1 and SW2, a PLL (PLL-TX) 20 for transmission, and a PLL (a PLL for self-test: PLL-BIST) 40 for BIST.

Moreover, the phased-array transmitter includes a digital control circuit 30 for transmission, a digital control circuit 50 for BIST, a mixer 6, and an analog amplitude/phase detection circuit 70. The PLL 20 for transmission is controlled by the dedicated digital control circuit 30 for transmission, and the PLL 40 for BIST is controlled by the dedicated digital control circuit 50 for BIST.

The transmission units 101 and 102 include variable gain amplifiers 111 and 112, phase shifters 121 and 122, power amplifiers 131 and 132, and couplers 141 and 142, respectively. The couplers 141 and 142 extract a part (signals to be tested) Stx1' and Stx2' of output signals (transmission signals: unit transmission waves) Stx1 and Stx2 from the power amplifiers 131 and 132, and input the extracted signals to the mixer 6 via the switches SW1 and SW2, respectively.

A signal Sst for self-test is input to the mixer 6 from the PLL 40 for BIST, and the output of the mixer 6 is input to the amplitude/phase detection circuit 70. For example, the couplers 141 and 142, the switches SW1 and SW2, the PLL 40 for BIST, the digital control circuit 50 for BIST, the mixer 6, and the amplitude/phase detection circuit 70 form the BIST circuit.

The BIST circuit, for example, is used in a phased-array transmitter of a FM-CW radar apparatus in order to reduce a test process at the time of manufacturing of a semiconductor chip in which the phased-array transmitter has been formed or at the time of assembling of the FM-CW radar apparatus.

Moreover, the BIST circuit, for example, is also used in order to highly accurately control the direction of the transmission wave of the phased-array transmitter, and the amplitude/phase detection circuit 70 detects and automatically corrects the amplitudes and phases of the transmission waves (the radiated radio waves) output from the transmission units 101 and 102.

In detail, the switch SW1 is turned on, the switch SW2 is turned off, the part Stx1' of the transmission wave Stx1 of the transmission unit 101, which has been extracted by the coupler 141, is input to the mixer 6, and is mixed with the signal Sst for self-test from the PLL 40 for BIST.

The output of the mixer 6 is input to the amplitude/phase detection circuit 70, the amplitude and phase of the transmission wave Stx1 of the transmission unit 101 are detected by the amplitude/phase detection circuit 70, and for example, feedback control for adjusting the transmission wave Stx1 to a desired size is performed.

Next, the switch SW1 is turned off, the switch SW2 is turned on, the part Stx2' of the transmission wave Stx2 of the transmission unit 102, which has been extracted by the coupler 142, is input to the mixer 6, and is mixed with the signal Sst for self-test from the PLL 40 for BIST.

In a similar manner to when the switch SW1 has been turned on, the output of the mixer 6 is input to the amplitude/phase detection circuit 70, the amplitude and phase of the transmission wave Stx2 of the transmission unit 102 are detected by the amplitude/phase detection circuit 70, and for example, feedback control for adjusting the transmission wave Stx2 to a desired size is performed.

Such a process is performed for all of the transmission units 101, 102, ..., 10n+1, so that the amplitudes and phases of the radio waves radiated from the transmission antennas ANT1, ANT2, ..., ANTn+1 of the phased-array transmitter are adjusted, and the control of directional characteristics is performed.

Such control, for example, is performed as described above at the time of power-up of the FM-CW radar apparatus provided with the phased-array transmitter or at the time of a rapid change and the like in environmental temperature in which the FM-CW radar apparatus is used.

The aforementioned control is not limited to the phased-array radar of the FM-CW radar apparatus and the like, and for example, is also applied in the same manner to a phased-array transmitter of a radio communication system, which performs large capacity of data transmission, and the like.

Figure 3:
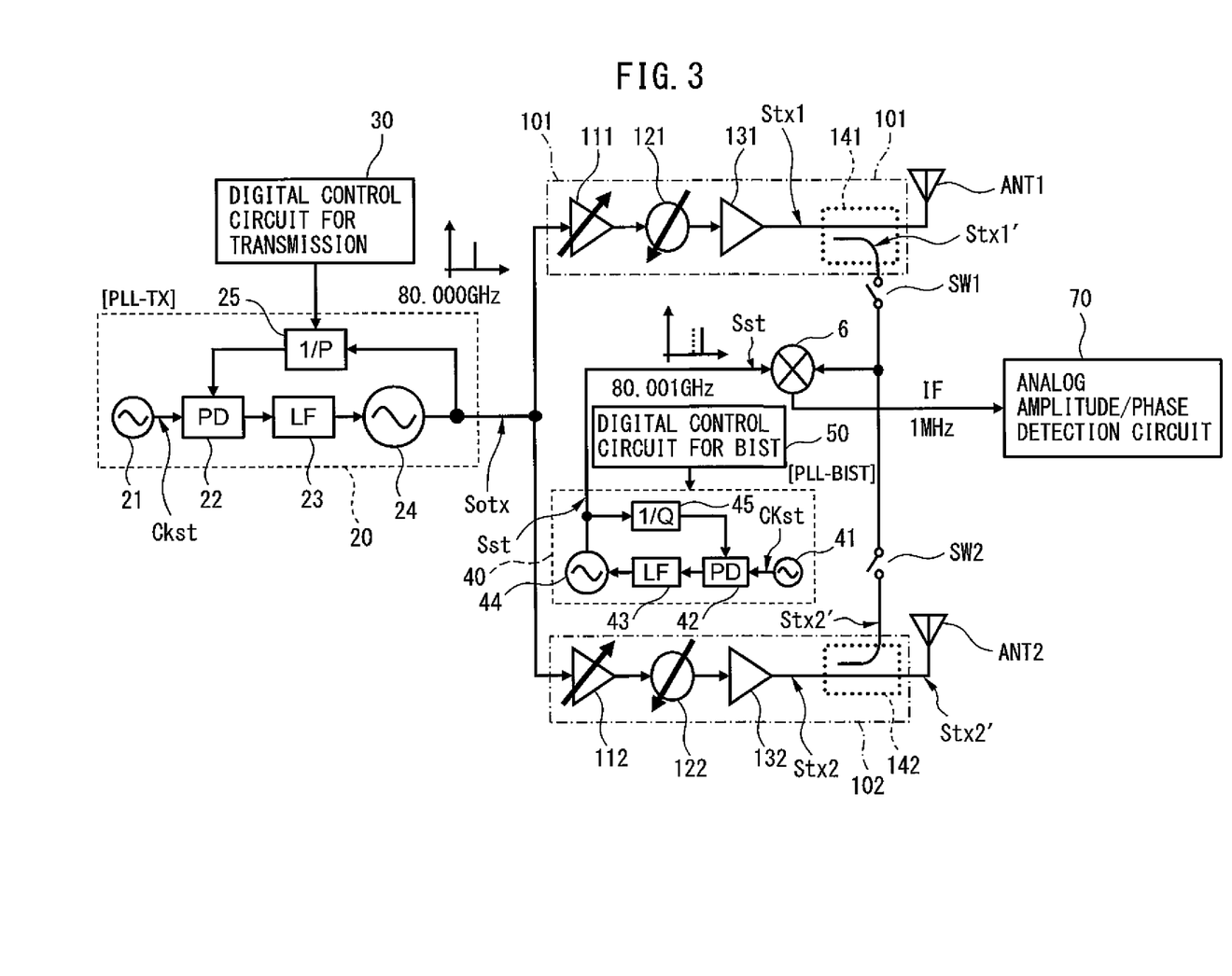
FIG. 3 is a block diagram illustrating in more detail main elements of a phased-array transmitter illustrated in FIG. 2.
Figure 4:
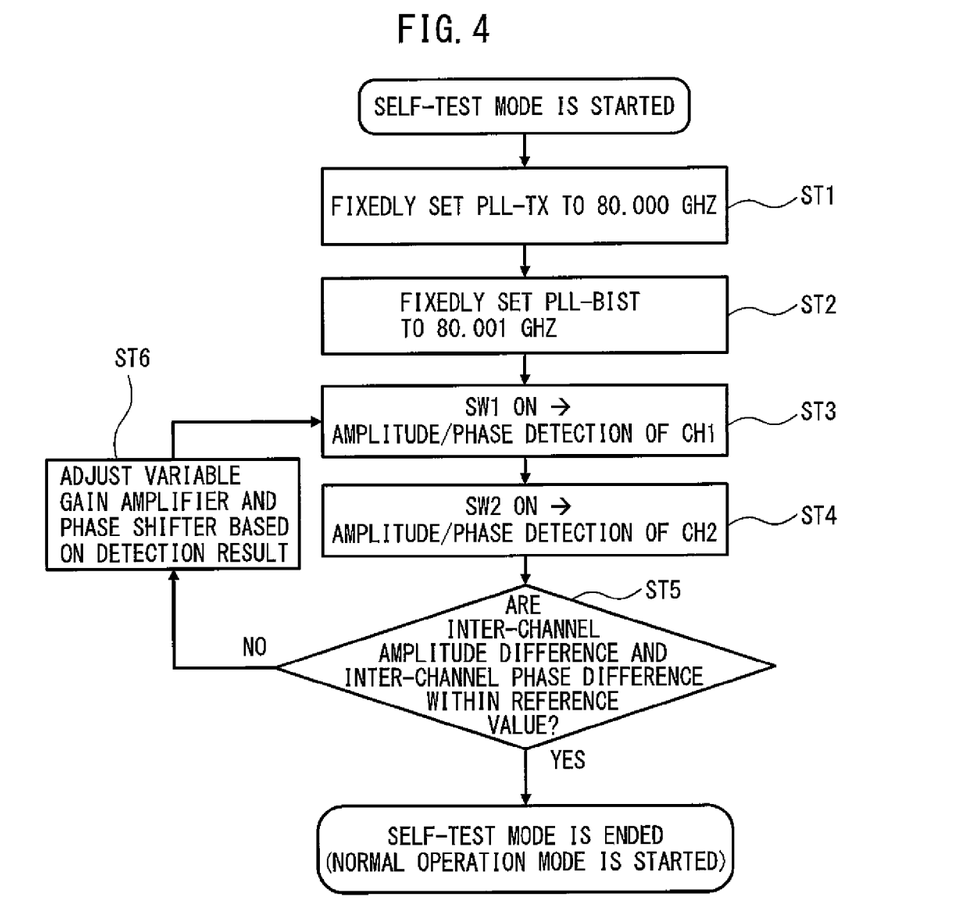
FIG. 4 is a flowchart for explaining an example of an operation of a phased-array transmitter illustrated in FIG. 3.

FIG. 3 is a block diagram illustrating in more detail main elements of the phased-array transmitter illustrated in FIG. 2, and illustrates in detail the PLL 20 for transmission and the PLL 40 for BIST. FIG. 4 is a flowchart for explaining an example of an operation of the phased-array transmitter illustrated in FIG. 3.

As illustrated in FIG. 3, the PLL 20 for transmission includes a reference clock oscillator 21 for transmission, a phase detector (PD) 22, and a loop filter (LF) 23. Moreover, the PLL 20 for transmission includes a digital controlled oscillator (DCO) 24 and a divider (1/P) 25.

A division ratio P of the divider 25, for example, is variably controllable by the digital control circuit 30 for transmission. As the DCO 24, for example, an analog voltage controlled oscillator (VCO) may also be applied.

The PLL 40 for BIST includes a reference clock oscillator 41 for BIST, a phase detector (PD) 42, and a loop filter (LF) 43, a digital controlled oscillator (DCO) 44, and a divider (1/Q) 45. A division ratio Q of the divider 45, for example, is variably controllable by the digital control circuit 50 for BIST. As the DCO 44, for example, an analog voltage controlled oscillator (VCO) may also be applied.

With reference to FIG. 3 and FIG. 4, a description will be provided for the process of a self-test (self-diagnosis) mode that performs self-test by using the BIST circuit and performs the control of the amplitudes and phases of the output signals (the unit transmission waves) of the transmission units 101 and 102 (101, 102, . . . , 10n+1).

As illustrated in FIG. 3 and FIG. 4, when the self-test mode is started, the digital control circuit 30 for transmission controls the PLL (PLL-TX) 20 for transmission, and, for example, sets the PLL (PLL-TX) 20 for transmission to output a clock (a reference transmission signal) Sotx with a fixed frequency of 80.000 GHz in step ST1.

In step ST2, the digital control circuit 50 for BIST controls the PLL (PLL-BIST) 40 for BIST, and, for example, sets the PLL (PLL-BIST) 40 for BIST to output a clock (a self-test signal) Sst with a fixed frequency of 80.001 GHz higher than the clock from the PLL 20 for transmission by 1 MHz.

In step ST3, the switch SW1 is turned on, the switch SW2 is turned off, and the output signal (the signal to be tested) Stx1' from the power amplifier 131 of the transmission unit 101 is input to the mixer 6 by the coupler 141 and is mixed with the clock Sst of 80.001 GHz from the PLL 40 for BIST.

The output signal (an intermediate frequency signal of 1 MHz) IF of the mixer 6 is input to the amplitude/phase detection circuit 70, and the amplitude and phase of the output signal (the unit transmission wave) Stx1 of the transmission unit 101 are detected by the amplitude/phase detection circuit 70.

In other words, the amplitude/phase detection circuit 70 performs A/D (Analog to Digital) conversion and fast Fourier transform (FFT) on the intermediate frequency signal IF, so that the amplitude and phase of the signal Stx1 are calculated.

In step ST4, the switch SW2 is turned on, the switch SW1 is turned off, and the signal Stx2' to be tested from the power amplifier 132 of the transmission unit 102 is input to the mixer 6 by the coupler 142 and is mixed with the clock Sst of 80.001 GHz from the PLL 40 for BIST. The output signal of the mixer 6 is input to the amplitude/phase detection circuit 70, and the amplitude and phase of the output signal Stx2 of the transmission unit 102 are detected by the amplitude/phase detection circuit 70.

When the number of the transmission units, i.e., the number of transmission channels is n+1, a process of turning on only one switch corresponding to each transmission unit and turning off other switches are repeated n+1 times, and the amplitude and phase of an output signal of each transmission unit are sequentially detected.

In step ST5, it is determined whether the inter-channel amplitude difference and the inter-channel phase difference are within a reference value, and when it is determined that the inter-channel amplitude difference and the inter-channel phase difference are not within the reference value, step ST6 is performed.

In step ST6, on the basis of the detection result by the amplitude/phase detection circuit 70, for example, the amplitudes and phases of the output signals of the transmission units are adjusted by the variable gain amplifiers 111 and 112 and the phase shifters 121 and 122, and the procedure returns to step ST3.

In step ST5, when it is determined that the inter-channel amplitude difference and the inter-channel phase difference are within the reference value, since it is regarded that the directional characteristics of the radiated waves from the phased-array transmitter satisfy a reference, the self-test mode is ended and a normal operation mode is started.

In the normal operation mode, the frequency of the radiated wave, i.e., the frequency of the reference transmission signal Sotx output from the PLL 20 for transmission is not a fixed frequency, and is periodically changed and is controlled to be continuously transmitted without any interruption.

In the phased-array transmitter described with reference to FIG. 2 to FIG. 4, for example, the reference clock oscillator 21 for transmission is provided to the PLL 20 for transmission and is controlled by the dedicated digital control circuit 30 for transmission. Moreover, for example, the reference clock oscillator 41 for BIST is provided to the PLL 40 for BIST and is controlled by the dedicated digital control circuit 50 for BIST.

In other words, the phased-array transmitter described with reference to FIG. 2 to FIG. 4 is provided with the two reference clock oscillators 21 and 41 for transmission and for BIST and the two digital control circuits 30 and 50 for transmission and for BIST. Therefore, it causes an increase in power consumption and an occupation area.

In the self-test mode, the output signal (the reference transmission signal) Sotx of the PLL 20 for transmission and the output signal (the self-test signal) Sst of the PLL 40 for BIST are set to fixed frequencies (for example, Sotx: 80.000 GHz and Sst: 80.001 GHz).

On the other hand, in the normal operation mode in which the phased-array transmitter is actually used, the frequency of the reference transmission signal Sotx output from the PLL 20 for transmission is periodically changed and is controlled to be continuously transmitted without any interruption.

Therefore, even if the self-test mode is switched to the normal operation mode, it is difficult to be immediately used as the phased-array transmitter. In other words, for example, in the phased-array transmitter in the FM-CW radar apparatus, it is difficult to shorten a processing time by the BIST circuit.

Hereinafter, an embodiment of a phased-array transmitter, a transceiver, and a radar apparatus will be described in detail with reference to the accompany drawings.

Figure 5:
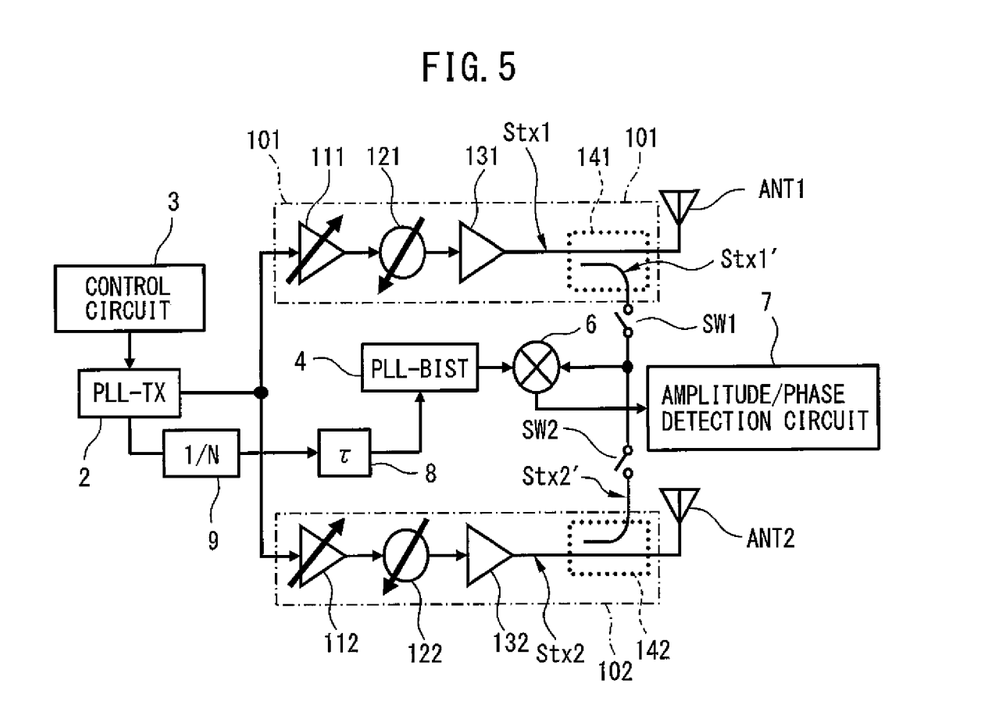
FIG. 5 is a block diagram illustrating an embodiment of a phased-array transmitter.

FIG. 5 is a block diagram illustrating an embodiment of a phased-array transmitter, and illustrates an example of a phased-array transmitter provided with a BIST circuit, for example, a phased-array transmitter (a transceiver) in a FM-CW radar apparatus.

FIG. 5 illustrates two transmission units 101 and 102, transmission antennas ANT1 and ANT2, and switches SW1 and SW2 for the simplification of a description; however, actually, n+1 transmission units 101, 102, . . . , 10n+1 and the like are provided similarly to FIG. 1 above.

Since a FM-CW transmitter does not use a pulse transmission wave, and uses a frequency-modulated continuous wave to perform measurement and the like of a distance to an object, it is possible to suppress peak power at the time of transmission to be low, and for example, to form a transmitter by one semiconductor chip.

As illustrated in FIG. 5, the phased-array transmitter includes two (a plurality of) transmission units 101 and 102, two transmission antennas ANT1 and ANT2, two switches SW1 and SW2, a PLL (PLL-TX) 2 for transmission, and a PLL (a PLL for self-test: PLL-BIST) 4 for BIST.

As illustrated in FIG. 5, the phased-array transmitter includes two (a plurality of) transmission units 101 and 102, two transmission antennas ANT1 and ANT2, two switches SW1 and SW2, a PLL (PLL-TX) 2 for transmission, and a PLL (PLL-BIST) 4 for BIST (self-test).

In other words, as apparent from the comparison of FIG. 5 and FIG. 2 above, in the phased-array transmitter of the present embodiment, the digital control circuit 30 for transmission and the digital control circuit 50 for BIST in FIG. 2 are integrated into a control circuit 3 that controls the PLL 2 for transmission.

Moreover, the phased-array transmitter includes the control circuit 3, a mixer 6, an amplitude/phase detection circuit 7, a delay circuit (τ) 8, and a first divider (1/N) 9. In other words, the first divider 9 has a fixed division ratio N, N-divides a reference transmission signal Sotx output from the PLL 2 for transmission, and outputs a divided signal to the delay circuit 8.

The configurations of the transmission units 101 and 102 are the same as those described with reference to FIG. 2 and FIG. 3, and include variable gain amplifiers 111 and 112, phase shifters 121 and 122, power amplifiers 131 and 132, and couplers 141 and 142, respectively. A signal Sst for self-test is input to the mixer 6 from the PLL 4 for BIST, and the output of the mixer 6 is input to the amplitude/phase detection circuit 7.

Figure 6:
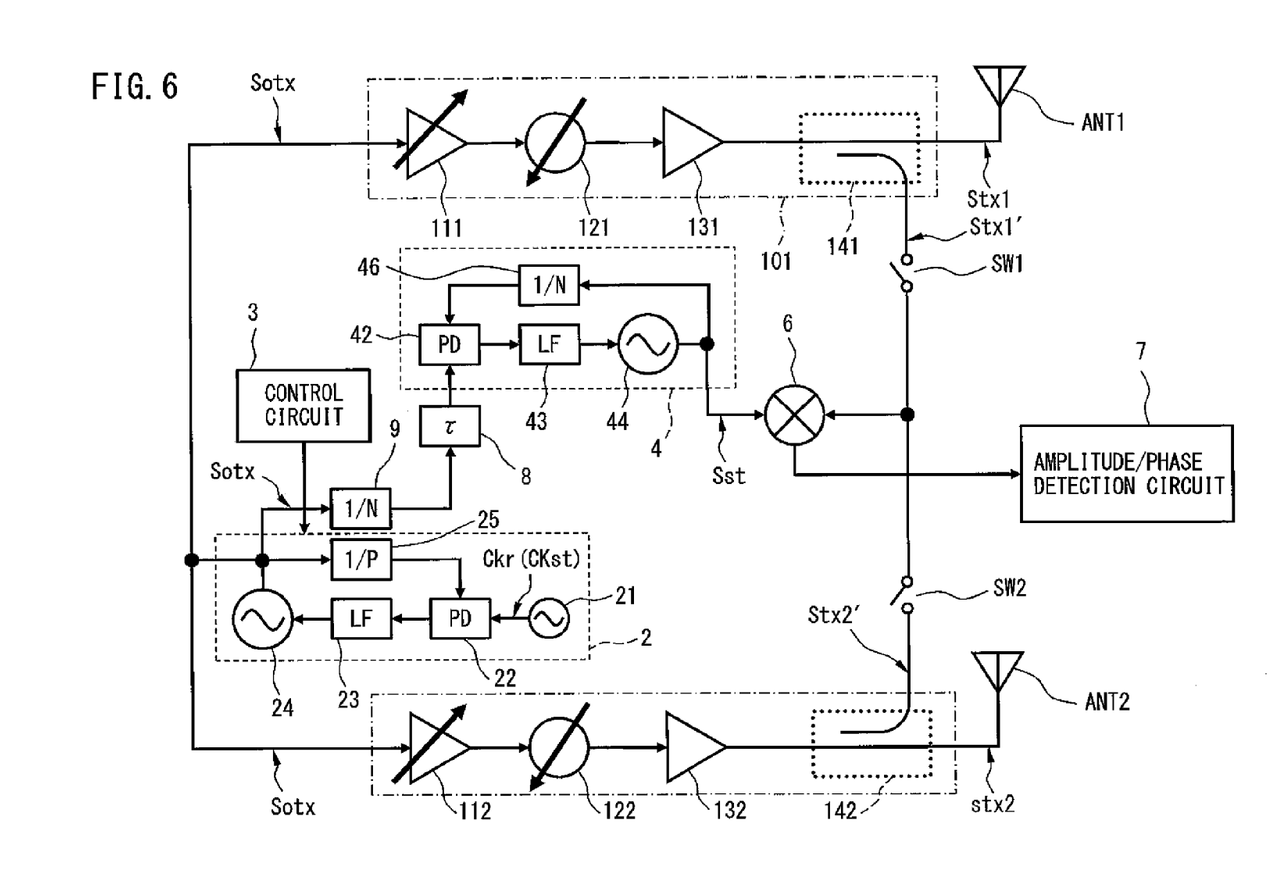
FIG. 6 is a block diagram illustrating in more detail main elements of a phased-array transmitter illustrated in FIG. 5.

FIG. 6 is a block diagram illustrating in more detail main elements of the phased-array transmitter illustrated in FIG. 5, and illustrates in detail the PLL 2 for transmission, the PLL 4 for BIST, and peripheral circuits thereof.

Figure 7:
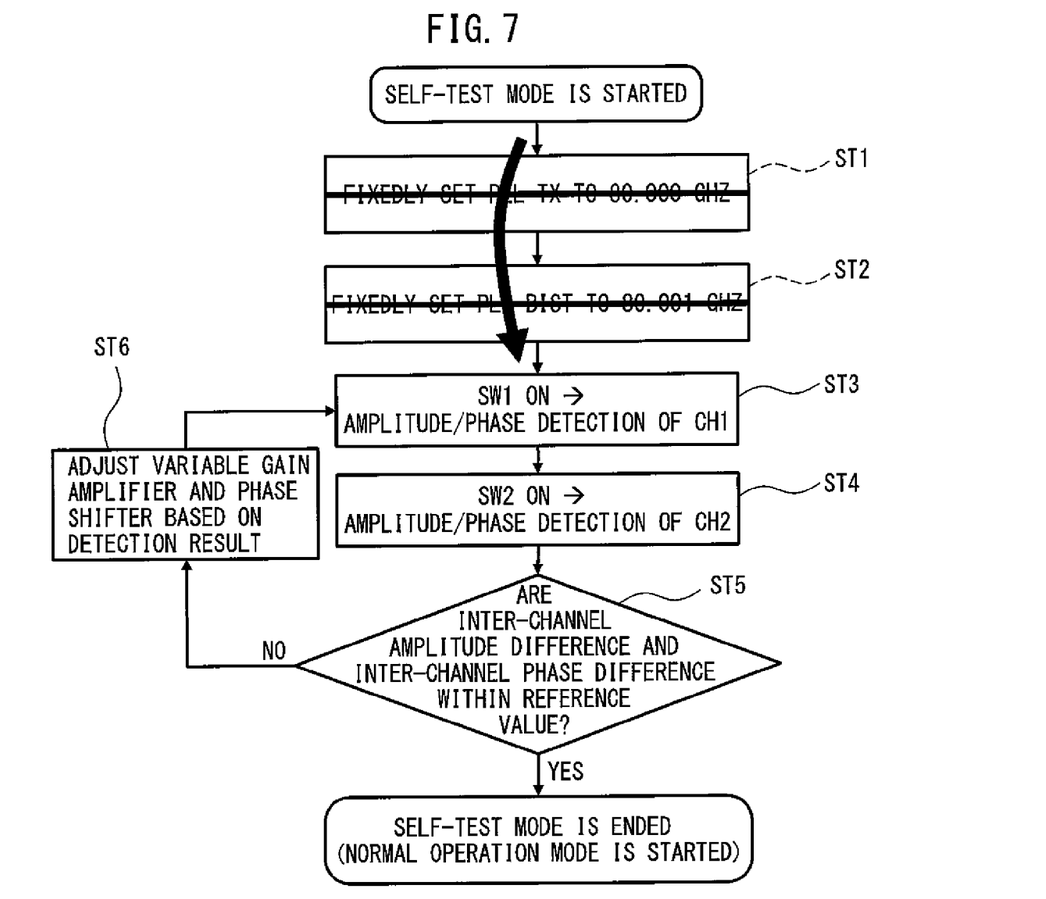
FIG. 7 is a flowchart for explaining an example of an operation of a phased-array transmitter illustrated in FIG. 6.
Figure 8:
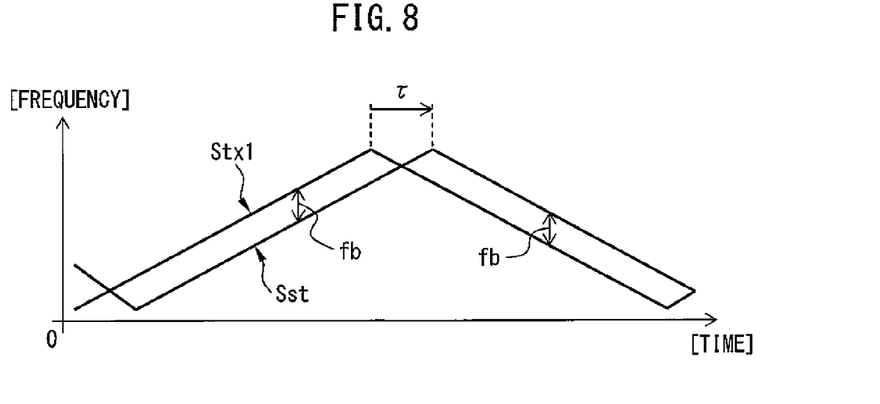
FIG. 8 is a diagram for explaining a self-test process in a phased-array transmitter illustrated in FIG. 6.

FIG. 7 is a flowchart for explaining an example of an operation of the phased-array transmitter illustrated in FIG. 6, and FIG. 8 is a diagram for explaining a self-test process in the phased-array transmitter illustrated in FIG. 6.

As illustrated in FIG. 6, the phased-array transmitter includes the two (the plurality of) transmission units 101 and 102, the two transmission antennas ANT1 and ANT2, the two switches SW1 and SW2, the PLL (PLL-TX) 2 for transmission, and the PLL (PLL-BIST) 4 for BIST (self-test).

The PLL (PLL-TX) 2 for transmission includes a reference clock oscillator 21, a phase detector (PD: a first phase detector) 22, a loop filter (LF: a first loop filter) 23, a digital controlled oscillator (DCO: a first oscillator) 24, and a second divider (1/P) 25.

The reference clock oscillator 21 corresponds to the reference clock oscillator for transmission that generates a reference clock for transmission in FIG. 3 above. The loop filter 23 reduces (filters) a high frequency component from an output signal of the phase detector 22.

A division ratio P of the second divider 25, for example, is variably controllable by the control circuit 3. As the DCO 24, for example, an analog voltage controlled oscillator (VCO) may also be applied.

The PLL 4 for BIST includes a phase detector (PD: a second phase detector) 42, a loop filter (LF: a second loop filter) 43, a digital controlled oscillator (DCO: a second oscillator) 44, and a third divider (1/N) 46.

The third divider 46 has a fixed division ratio N similarly to the first divider 9, N-divides an output signal of the digital controlled oscillator 44, and feedbacks the divided signal to the phase detector 42. As the DCO 44, for example, an analog voltage controlled oscillator (VCO) may also be applied. The loop filter 43 reduces (filters) a high frequency component from an output signal of the phase detector 42.

As described above, the reference transmission signal Sotx output from the PLL 2 for transmission is N-divided by the first divider 9, and the divided output signal is input to the phase detector 42 of the PLL 4 for BIST via the delay circuit 8. In other words, the phase detector 42 receives an output signal of the delay circuit 8 and an output signal of the third divider 46 and performs phase comparison (phase detection).

Next, with reference to FIG. 6 and FIG. 7, a description will be provided for the process of a self-test (self-diagnosis) mode that performs self-test by using the BIST circuit and performs the control of the amplitudes and phases of the output signals (the transmission waves) of the transmission units 101 and 102 (101, 102, . . . , 10n+1).

As apparent from the comparison of FIG. 7 and FIG. 4 above, in the present embodiment, even if the self-test mode is started, processes of step ST1 and ST2 are not performed, and step ST3 is directly performed. In other words, in the self-test mode by the phased-array transmitter of the present embodiment, the PLL (PLL-TX) 2 for transmission and the PLL (PLL-BIST) 4 for BIST do not output a clock with a fixed frequency, and continuously outputs a frequency-modulated continuous wave, similarly to the normal operation mode.

Therefore, as illustrated in FIG. 6 and FIG. 7, when the self-test mode is started, step ST3 is performed so that the switch SW1 is turned on and the switch SW2 is turned off. The output signal (the signal to be tested) Stx1' from the power amplifier 131 of the transmission unit 101 is input to the mixer 6 by the coupler 141 and is mixed with the clock (the self-test signal) Sst from the PLL 4 for BIST.

Hereinafter, the self-test process of the present embodiment will be described with reference to FIG. 8. In FIG. 8, a reference numeral Stx1 denotes a unit transmission wave from the transmission unit 101 as a transmission wave (an output signal), and a reference numeral Sst denotes a self-test signal from the PLL 4 for BIST as a reception wave. A reference numeral fb corresponds to time delay of a reception wave in the FM-CW scheme and denotes a beat frequency that is a frequency difference between a transmission wave and a reception wave that are output from the mixer 6.

As illustrated in FIG. 8, according to the present embodiment, for example, the transmission wave Stx1 from the transmission unit 101 and the self-test signal Sst from the PLL 4 for BIST are input to the mixer 6. A signal, which is obtained by N-dividing the reference transmission signal Sotx output from the PLL 2 for transmission by the first divider 9 and by delaying the divided signal by a delay time T by the delay circuit 8, is input to the phase detector 42 of the PLL 4 for BIST.

In addition, a signal, which is obtained by N-dividing the output signal (the self-test signal) Sst of the digital controlled oscillator 44 by the third divider 46 having the same division ratio N as the division ratio N of the first divider 9, is input to the phase detector 42.

In this way, even in the self-test mode as illustrated in FIG. 8, the state in which a frequency difference occurs is realized similarly to the normal mode. In other words, it is not necessary to perform the control for setting the fixed frequency (80.000 GHz and 80.001 GHz) in the self-test mode, which has described with reference to FIG. 2 to FIG. 4.

The output signal (the beat frequency signal) fb of the mixer 6 is input to the analog amplitude/phase detection circuit 7, and the amplitude and phase of the output signal (the unit transmission wave) Stx1 of the transmission units 101 are detected. In other words, the analog amplitude/phase detection circuit 7 performs A/D conversion and FFT on the beat frequency signal fb, so that the amplitude and phase of the signal Stx1 are calculated.

In step ST4, the switch SW2 is turned on, the switch SW1 is turned off, and the signal Stx2' to be tested from the power amplifier 132 of the transmission unit 102 is input to the mixer 6 by the coupler 142 and is mixed with the signal Sst for self-test from the PLL 40 for BIST. The output signal of the mixer 6 is input to the amplitude/phase detection circuit 7, and the amplitude and phase of the output signal Stx2 of the transmission unit 102 are detected by the amplitude/phase detection circuit 70.

When the number of the transmission units, i.e., the number of transmission channels is n+1, a process of turning on only one switch corresponding to each transmission unit and turning off other switches are repeated n+1 times, and the amplitude and phase of an output signal of each transmission unit are sequentially detected.

In step ST5, it is determined whether the inter-channel amplitude difference and the inter-channel phase difference are within a reference value, and when it is determined that the inter-channel amplitude difference and the inter-channel phase difference are not within the reference value, step ST6 is performed.

In step ST6, on the basis of the detection result by the amplitude/phase detection circuit 7, for example, the amplitudes and phases of the output signals of the transmission units are adjusted by the variable gain amplifiers 111 and 112 and the phase shifters 121 and 122, and the procedure returns to step ST3.

In step ST5, when it is determined that the inter-channel amplitude difference and the inter-channel phase difference are within the reference value, since it is regarded that the directional characteristics of the radiated waves from the phased-array transmitter satisfy a reference, the self-test mode is ended and the normal operation mode is started.

In the present embodiment, in the self-test mode, both the output signal of the delay circuit 8 and the output signal of the third divider 46 input to the phase detector 42 are based on the reference transmission signal Sotx output from the PLL 2 for transmission, and are frequency-modulated continuous waves.

Consequently, according to the present embodiment, when the self-test mode is ended and the normal mode is started, for example, as described with reference to FIG. 2 to FIG. 4, a process, in which the fixed frequency of the self-test mode is switched to the frequency-modulated continuous wave of the normal mode, is not needed.

As described above, according to the present embodiment, the reference clock oscillator 41 for BIST and the control circuit 50 for BIST that controls the PLL for BIST are not needed, so that it is possible to reduce power consumption and an occupation area.

Moreover, according to the present embodiment, it is possible to simplify a control procedure in the self-test mode to shorten a test time, and to immediately perform switching from the self-test mode to the normal mode.

Figure 9:
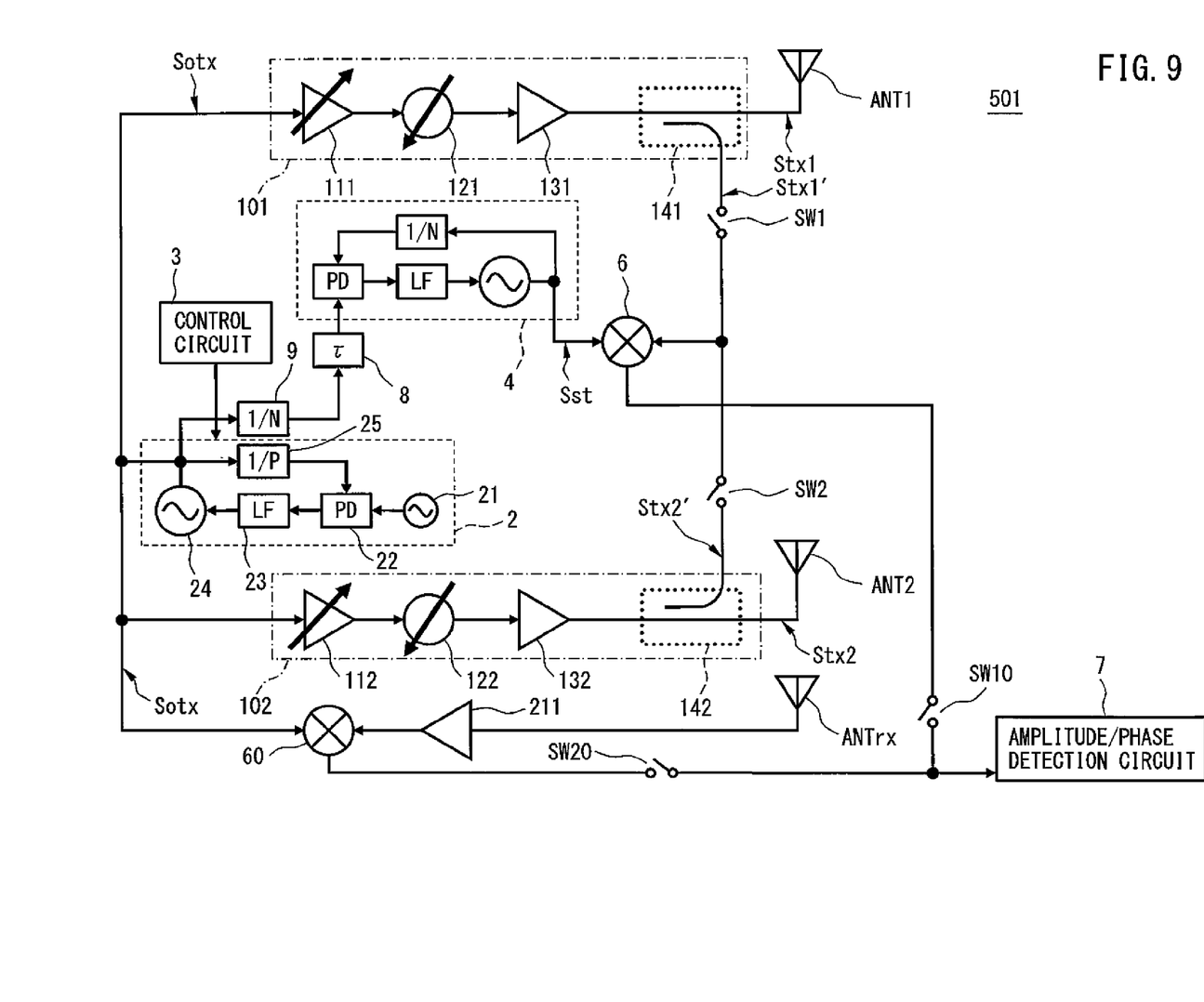
FIG. 9 is a block diagram illustrating an example of a transceiver according to the present embodiment.

FIG. 9 is a block diagram illustrating an example of a transceiver according to the present embodiment, and is obtained by adding the configuration of a receiver to the phased-array transmitter illustrated in FIG. 6 above.

As illustrated in FIG. 9, in a transceiver 501 according to the present embodiment, a reception antenna ANTrx, a low noise amplifier 211, a mixer 69, and switches SW10 and SW20 are added to the transmitter described with reference to FIG. 5 to FIG. 7.

In the aforementioned self-test mode, the switch SW10 is turned on, and the switch SW20 is turned off, so that the output signal of the mixer 6 is input to the analog amplitude/phase detection circuit 7. In the normal mode (at the time of reception), the switch SW10 is turned off, and the switch SW20 is turned on, so that the output signal of the mixer 60 is input to the analog amplitude/phase detection circuit 7.

FIG. 9 illustrates only one reception antenna ANTrx and only one low noise amplifier 211; however, actually, a plurality of reception antennas and a plurality of low noise amplifiers are provided similarly to the transmission units 101 and 102. In addition, FIG. 9 illustrates that the reception antenna ANTrx is provided independent of the transmission antennas ANT1 and ANT2; however, for example, a duplexer and the like may be used to form an antenna commonly used for transmission and reception.

Figure 10:
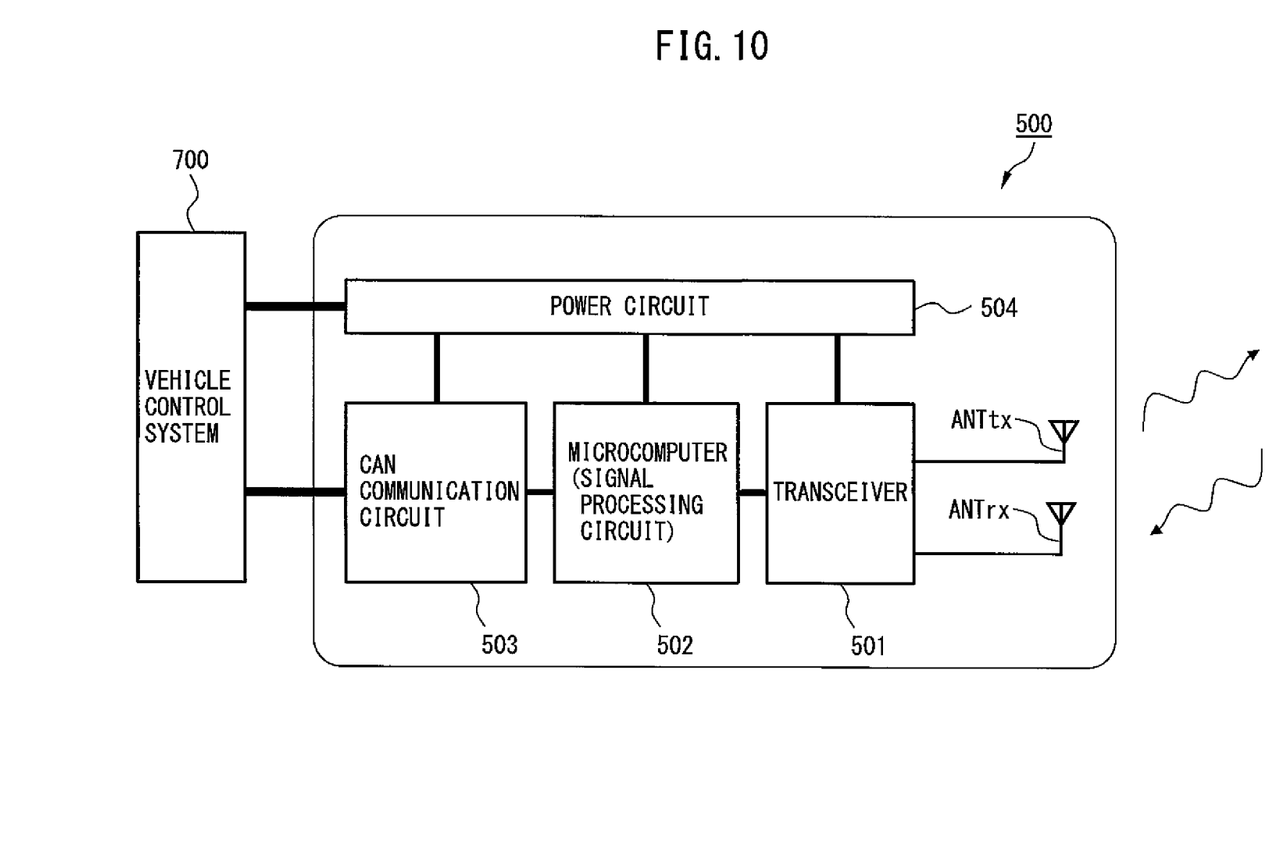
FIG. 10 is a block diagram illustrating an example of a radar apparatus according to the present embodiment.

FIG. 10 is a block diagram illustrating an example of a radar apparatus according to the present embodiment, and illustrates an example of a FM-CW radar apparatus 500 mounted in a vehicle.

As illustrated in FIG. 10, the FM-CW radar apparatus 500 is controlled by a vehicle control system (an upper system) 700, and includes the transceiver 501, a microcomputer (a signal processing circuit 502), a CAN communication circuit 503, a power circuit 504, a transmission antenna ANTtx, and a reception antenna ANTrx.

The CAN communication circuit 503 is a circuit that is designed in consideration of noise resistance and performs communication based on CAN (Controller Area Network: standardization as ISO11898 and ISO11519) that is a standard used for data transmission between interconnected devices.

In the FM-CW radar apparatus 500, for example, the plurality of semiconductor chips 501 to 504 and the transmission and reception antennas ANTtx and ANTrx may be packaged into one. In addition, for example, when a frequency to be used is changed from a millimeter wave to a terahertz, it is possible to form one semiconductor chip including an antenna.

So far, the present embodiment is not limited to the FM-CW radar apparatus, and the transceiver and the transmitter applied to the FM-CW radar apparatus, and can also be applied to various devices provided with the BIST circuit and having a self-test function.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations can be made hereto without departing from the spirit and scope of the invention.

What is claimed is:

1. A phased-array transmitter comprising:
   a first PLL for transmission configured to generate a reference transmission signal;
   a control circuit configured to control the first PLL;
   a plurality of transmission units configured to receive the reference transmission signal, and perform amplification and phase control to output unit transmission waves, respectively;
   a delay circuit configured to delay a signal based on the reference transmission signal; and
   a second PLL for self-test configured to receive an output signal of the delay circuit, and generate a self-test signal for performing self-test.

2. The phased-array transmitter according to claim 1, the phased-array transmitter further comprising:
   a first divider configured to receive the reference transmission signal, divide the reference transmission signal by a fixed first division ratio, and output a divided signal to the delay circuit.

3. The phased-array transmitter according to claim 1, the phased-array transmitter further comprising:
   a plurality of couplers configured to extract a part of the unit transmission waves, respectively;
   a switch configured to select an output signal of any one of the couplers;
   a mixer configured to mix the output signal of any one of the couplers selected by the switch with the self-test signal from the second PLL; and
   an analog amplitude/phase detection circuit configured to receive output of the mixer, and detect amplitudes and phases of the respective unit transmission waves.

4. The phased-array transmitter according to claim 1, the phased-array transmitter further comprising:
   a plurality of transmission antennas provided corresponding to the transmission units to radiate the respective unit transmission waves.

5. The phased-array transmitter according to claim 2, wherein the first PLL comprises:
   a reference clock oscillator configured to generate a reference clock;
   a second divider configured to receive the reference transmission signal, and divide the reference transmission signal by a second division ratio variably controlled by the control circuit;
   a first phase detector configured to receive an output signal of the second divider and the reference signal, and perform phase comparison;
   a first loop filter configured to reduce a high frequency component from an output signal of the first phase detector; and
   a first oscillator configured to generate the reference transmission signal having a frequency based on an output signal of the first loop filter.

6. The phased-array transmitter according to claim 5, wherein the second PLL comprises:
   a third divider configured to perform division by the first division ratio similarly to the first divider;
   a second phase detector configured to receive an output signal of the third divider and the output signal of the delay circuit, and perform phase comparison;
   a second loop filter configured to reduce a high frequency component from an output signal of the second phase detector; and
   a second oscillator configured to generate the self-test signal having a frequency based on an output signal of the second loop filter.

7. The phased-array transmitter according to claim 1, wherein the phased-array transmitter is a phased-array transmitter in a FM-CW phased-array apparatus.

8. A transceiver comprising:
   a phased-array transmitter; and
   a receiver, wherein
   the phased-array transmitter comprises:
      a first PLL for transmission configured to generate a reference transmission signal;
      a control circuit configured to control the first PLL;
      a plurality of transmission units configured to receive the reference transmission signal, and perform amplification and phase control to output unit transmission waves, respectively;
      a delay circuit configured to delay a signal based on the reference transmission signal; and
      a second PLL for self-test configured to receive an output signal of the delay circuit, and generate a self-test signal for performing self-test.

9. The transceiver according to claim 8, wherein the receiver comprises:
   a reception antenna; and
   a low noise amplifier that amplifies a reception signal from the reception antenna, and outputs an amplified signal.

10. A radar apparatus comprising:
    a transceiver;
    a power circuit;
    a communication circuit that performs communication with an upper system; and
    a signal processing circuit that communicates with the upper system via the communication circuit, and controls the transceiver, wherein
    the transceiver comprises:
       a phased-array transmitter; and
       a receiver, wherein
       the phased-array transmitter comprises:
          a first PLL for transmission configured to generate a reference transmission signal;
          a control circuit configured to control the first PLL;
          a plurality of transmission units configured to receive the reference transmission signal, and perform amplification and phase control to output unit transmission waves, respectively;
          a delay circuit configured to delay a signal based on the reference transmission signal; and a second PLL for self-test configured to receive an output signal of the delay circuit, and generate a self-test signal for performing self-test.

\* \* \* \* \*